United States Patent [19]

Schmitt

[11] Patent Number: 4,469,940
[45] Date of Patent: Sep. 4, 1984

[54] SWITCHING APPARATUS FOR ABSOLUTE POSITION MEASURING DEVICE

[75] Inventor: Walter Schmitt, Traunreut, Fed. Rep. of Germany

[73] Assignee: Dr. Johannes Heidenhain GmbH, Traunreut, Fed. Rep. of Germany

[21] Appl. No.: 328,374

[22] Filed: Dec. 7, 1981

[30] Foreign Application Priority Data

Dec. 27, 1980 [DE] Fed. Rep. of Germany ....... 3049261

[51] Int. Cl.³ ............................................. H01J 40/14
[52] U.S. Cl. ............................ 250/214 R; 250/237 G
[58] Field of Search ........ 250/231 SE, 237 G, 214 R, 250/206, 578; 356/395; 340/347 P

[56] References Cited

U.S. PATENT DOCUMENTS 3,534,360 10/1970 Hafle ............................ 250/231 SE
4,184,071 1/1980 Fryer et al. ..................... 250/237 G
4,278,969 7/1981 Woods .......................... 250/231 SE
4,327,362 4/1982 Hoss ................................ 340/347 P Primary Examiner—David C. Nelms
Attorney, Agent, or Firm—Willian Brinks Olds Hofer Gilson & Lione Ltd.

[57] ABSTRACT

A switching apparatus for an absolute position measuring device of the type including a coded scale and a scanning unit for reading the coded scale, wherein the scanning unit includes a plurality of electrical components. The disclosed switching apparatus includes a capacitor connected in parallel with the electrical components and a switching element, such as a transistor, connected in series with the electrical components and in parallel with the capacitor. The switching element is responsive to a switching signal to selectively apply a supply voltage to and interrupt the supply voltage from the electrical components, all without charging or discharging the capacitor.

10 Claims, 2 Drawing Figures

SWITCHING APPARATUS FOR ABSOLUTE POSITION MEASURING DEVICE

BACKGROUND OF THE INVENTION

This invention relates to an improved switching apparatus for absolute length- or angle-measuring devices of the type which include a coded scale; a scanning unit for reading the coded scale, which scanning unit comprises a plurality of electrical components; means for generating a supply voltage across two voltage supply terminals; and means for generating a switching signal used to switch the electrical components of the scanning unit on and off.

In position measuring devices of the general type described above, it is standard practice to switch on the electrical components of the scanning unit only briefly during the interrogation of the scanning unit for absolute position values, in order to save current. It is a known practice to utilize a computer, included in the position measuring device, to control a switch which acts to switch the supply voltage supplying the scanning unit on and off. The switch has in the past been located outside of the scanning unit, for example in the computer itself. Furthermore, if the electronic components of the scanning unit, such as for example one or more illuminating elements such as light-emitting diodes, are connected over long conductors to the supply voltage, then it is standard practice to connect one or more blocking capacitors across the supply voltage in parallel with the electrical components. These blocking capacitors additionally prevent a possible ringing of the integrated circuits which are often included in the electrical components of the scanning unit.

When this prior art approach is used, each interrogation of the scanning unit to determine a position code requires that the switch be closed in order to charge these capacitors. In the case of relatively rapid switching, considerable charging currents can result. Furthermore, many elements of the scanning unit, such as light-emitting diodes, for example, cannot be activated until the blocking capacitors have been charged. In this way, the initiation of illumination and operation of the scanning unit can be delayed. Furthermore, once the switch is opened, the blocking capacitors may discharge through the electronic components of the scanning unit, thereby applying voltage to these elements for a longer period than is necessary. In this way, the period in which the light sources such as diodes are illuminated is extended beyond the desired period.

SUMMARY OF THE INVENTION

The present invention is directed to an improved switching arrangement for an absolute position measuring device of the type described above, which switching arrangement avoids the foregoing disadvantages.

According to this invention, an absolute position measuring device of the type described above is provided with means for connecting the electrical components of the scanning unit across the voltage supply terminals; a capacitor connected across the voltage supply terminals in parallel with the electrical components; and a switching element, included in the connecting means in series with the electrical components and in parallel with the capacitor, responsive to the switching signal to selectively apply the supply voltage to and to interrupt the supply voltage from the electrical components.

One important advantage of this invention is that it makes possible a rapid switching of the supply voltage, as well as a substantially delay-free switching on and off of electrical components such as light-emitting diodes included in the scanning unit. In this way, the current requirement for the scanning unit is reduced. Further advantageous features of this invention are defined in the depending claims.

The invention itself, together with further objects and attendant advantages, will best be understood by reference to the following detailed description taken in conjunction with the accompanying drawings.

DETAILED DESCRIPTION OF THE PRESENTLY PREFERRED EMBODIMENTS

Figure 1:
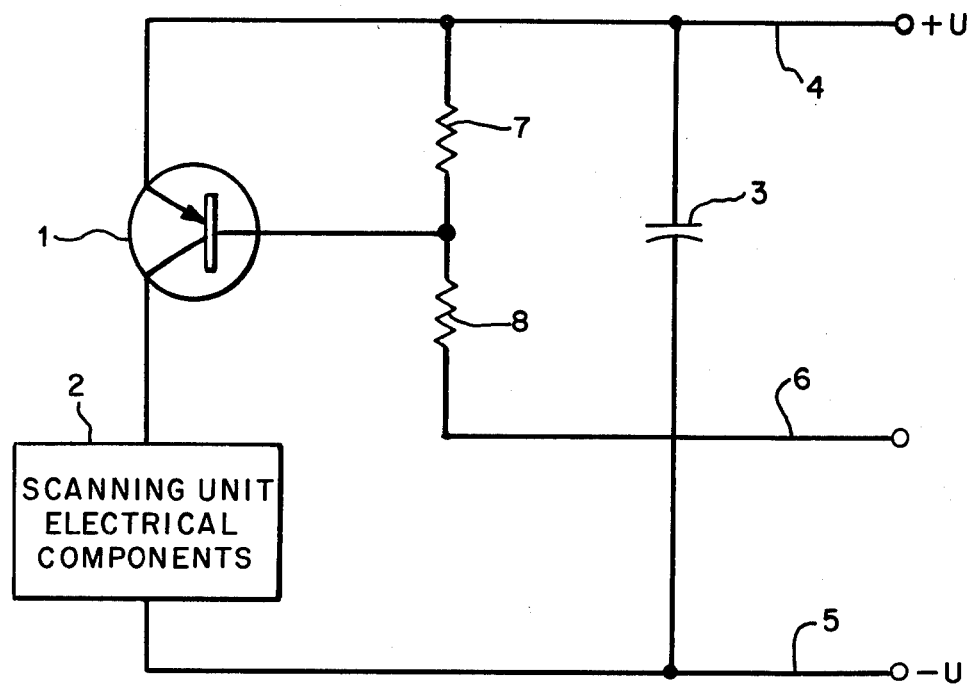
FIG. 1 is a schematic diagram of a first preferred embodiment of the switching arrangement of this invention.

Turning now to the drawings, FIG. 1 shows a schematic view of a first preferred embodiment of the switching apparatus of this invention. This embodiment is designed for use in an absolute length- or angle-measuring device of the type having a coded scale, a scanning unit for reading the coded scale, means for generating a switching signal, and means for generating a supply voltage between a pair of voltage supply terminals, wherein the scanning unit comprises a plurality of electrical components powered by the supply voltage. Throughout this specification and the following claims the term "absolute position measuring device" will be used to encompass both absolute length and absolute angle measuring devices. The components of the absolute position measuring device described in this paragraph are conventional and known to the art. These components will not therefore be described here. It should be understood, however, that the switching apparatus of this invention can be adapted for use with a wide range of absolute position measuring devices.

As shown in FIG. 1, the first preferred embodiment includes a switching transistor 1, such as a field effect transistor, which is connected between one or more electronic components 2 included in the scanning unit and a conductor 4, which extends to a first, positive terminal of a voltage supply. These components 2 are in turn connected via a conductor 5 to a second, negative terminal of the voltage supply. In use, a positive voltage +U would be applied to conductor 4 and a negative supply voltage −U would be applied to conductor 5. A capacitor 3 is connected between conductors 4 and 5 in parallel with transistor 1 and electrical components 2. The electrical components 2 may include, for example, light-emitting diodes (not shown) for the illumination of the coded scale as well as amplifiers, pulse forming circuits, and digital gating circuits for the processing of signals generated by photo-sensitive elements included in the scanning unit for scanning the coded scale.

The base of the switching transistor 1 is driven via a conductor 6 by a computer (not shown), included in the position measuring device.

The computer (not shown) generates a switching signal which is applied to conductor 6 and via resistor 8 to the base of the transistor 1 in order selectively to turn the transistor 1 on or off. The resistors 7,8 serve for the level adjustment of the switch signal.

Since the capacitor 3 extends between the conductors 4 and 5, and has to be charged only when the measuring device is turned on initially, the switching transistor 1 alternatively applies the supply voltage $-U$ to the electrical components 2 in a low resistance manner or interrupts the connection between the electrical components 2 and the conductor 4, depending on the state of the switching signal on conductor 6. In this way, a lag-free switching on and off of elements such as light-emitting diodes included in the electrical components 2 is achieved, as well as a substantial reduction of the current requirement. This is because the capacitor 3 is not recharged for each interrogation of the scanning unit and each activation of the electrical components 2. Similarly, because elements such as light emitting diodes included in the electrical components 2 can be quickly deactivated when desired, the time during which the elements are activated is reduced. In this way, the useful life of electrical components 2 such as light-emitting diodes is substantially increased. The switching arrangement shown in FIG. 1 can be used to achieve switching times of less than one microsecond.

The switching arrangement shown in FIG. 1 insures that in a case of an open circuit in the conductor 6 or a short circuit between the conductor 6 and the conductor 4, the electrical components 2 are switched off from the supply voltage $+U$.

Figure 2:
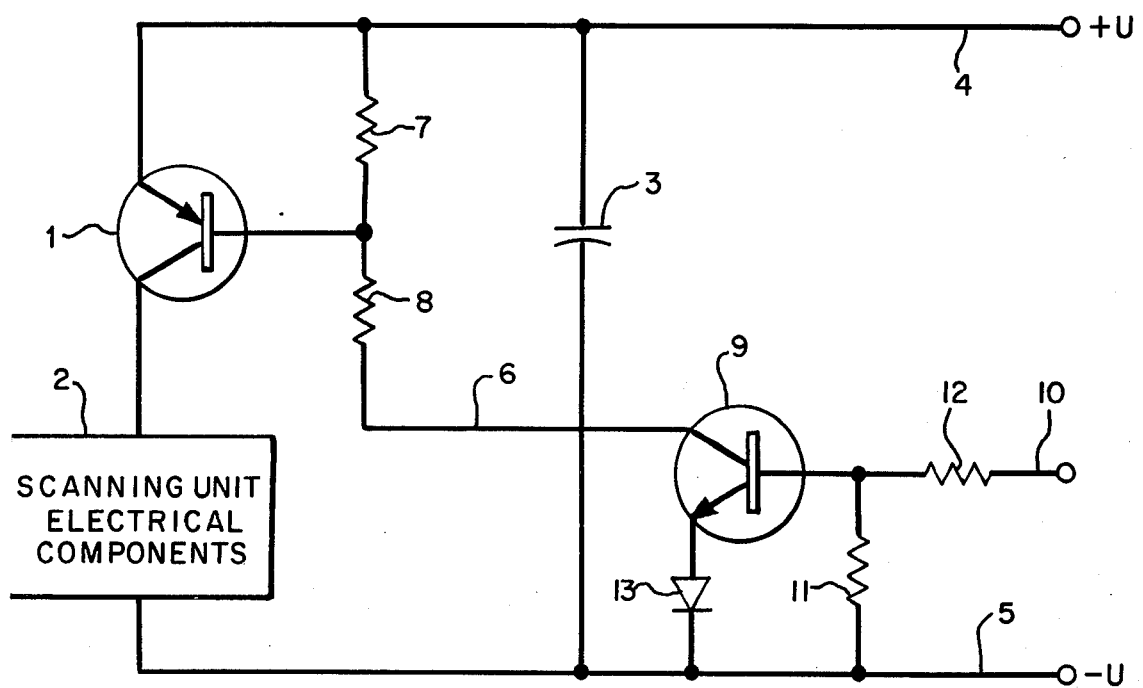
FIG. 2 is a schematic diagram of a second preferred embodiment of the switching arrangement of this invention.

FIG. 2 shows a second preferred embodiment of the switching arrangement of this invention, in which the switching arrangement of FIG. 1 is provided with an additional transistor 9 in order to provide an alternate safeguard against short circuits. In FIG. 2, the same reference symbols are used for corresponding elements of FIG. 1. The second transistor 9 is provided with a collector terminal which is connected to the conductor 6. This transistor 9 also includes a base terminal which is driven via a control conductor 10 by a computer (not shown). As explained above, this computer operates to generate a switching signal which is applied via the conductor 10 to the base terminal of the transistor 9. The resistors 11,12 serve for the level adjustment of the switching signals. The transistor 9 also includes an emitter terminal which is connected via a forwardly biased diode 13 via the conductor 5 to the supply voltage $-U$. The diode 13 brings about an optimal adaptation of the threshold voltage of the transistor 9 to the switching signal of the computer.

The switching arrangement shown in FIG. 2 insures that in the case of either an open circuit in the conductor 10 or a short circuit between the conductor 10 and the supply voltage $-U$, the electrical components 2 are switched off from the supply voltage $+U$.

From the foregoing, it should be apparent that two embodiments of a switching apparatus have been disclosed, both of which provide high switching rates and excellent control over the time at which power is applied to the electrical components 2, and the time at which power is removed from these components, all without sacrificing the protection of the capacitor 3.

Of course, it should be understood that various changes and modifications to the preferred embodiments described herein will be apparent to those skilled in the art. For example, other types of switching elements can be substituted for the transistors 1 and 9. It is therefore intended that the foregoing detailed description be regarded merely as illustrative of the presently preferred embodiments. It is intended that the following claims, included all equivalents, define the scope of this invention.

I claim:

1. In an absolute position measuring device comprising a coded scale; a scanning unit for reading the coded scale, said scanning unit comprising a plurality of electrical components; means for generating a switching signal; and means for generating a supply voltage between a pair of voltage supply terminals, the improvement comprising:

means for connecting the electrical components of the scanning unit across the voltage supply terminals;

at least a capacitor connected across the voltage supply terminals in parallel with the electrical components; and a switching element, included in the connecting means in series with the electrical components and in parallel with the capacitor, responsive to the switching signal to selectively apply the supply voltage to and interrupt the supply voltage from the electrical components.

2. The invention of claim 1 wherein the switching element comprises a first transistor.

3. The invention of claim 1 wherein the switching element comprises a field effect transistor.

4. The invention of claim 2 wherein the first transistor comprises a base terminal connected to the means for generating a switching signal.

5. The invention of claim 2 wherein the switching element further comprises a second transistor having a collector terminal and a base terminal, wherein the collector terminal of the second transistor is connected to a base terminal of the first transistor and the base terminal of the second transistor is connected to the means for generating a control signal.

6. The invention of claim 2 wherein the first transistor comprises a base terminal and the invention further comprises a resistor connected between the base terminal and a selected one of the pair of voltage supply terminals.

7. The invention of claim 1 wherein the scanning unit comprises at least one photosensitive element for scanning the coded scale, and wherein the plurality of electrical components in series with the switching element comprises:

at least one light emitting diode for illuminating the coded scale; and at least one amplifier and at least one pulse forming circuit for processing scanning signals generated by the at least one photosensitive element.

8. The invention of claim 1 wherein the switching signal is less then about one microsecond in duration, and wherein the switching element selectively applies the supply voltage to the electrical components for less than about one microsecond at a time.

9. The invention of claim 7 wherein the switching signal is less than about one microsecond in duration, and wherein the switching element selectively applies the supply voltage to the electrical components for less than about one microsecond at a time.

10. In an absolute position measuring device of the type comprising a coded scale; a scanning unit comprising at least one light emitting diode for illuminating the coded scale, at least one photosensitive element for scanning the coded scale, and at least one amplifier and pulse forming circuit for processing scanning signals generated by the at least one photosensitive element; means for generating a switching signal; and means for generating a supply voltage between a pair of voltage supply terminals; the improvement comprising:
   means for connecting the light emitting diode, the photosensitive element; the amplifier, and the pulse forming circuit of the scanning unit across the voltage supply terminals;
   at least one capacitor connected across the voltage supply terminals in parallel with the light emitting diode, photosensitive element, amplifier, and pulse forming circuit of the scanning unit; and
   a switching transistor, included in the connecting means in series with the light emitting diode, photosensitive element, amplifier, and pulse forming circuit of the scanning unit and in parallel with the capacitor, said switching element responsive to the switching signal to selectively apply the supply voltage to and interrupt the supply voltage from the light emitting diode, the photosensitive element, the amplifier, and the pulse forming circuit of the scanning unit;
   said switching signal having a duration less than about 1 microsecond such that the switching element selectively applies the supply voltage to the light emitting diode, the photosensitive element, the amplifier, and the pulse forming circuit for less than about 1 microsecond at a time.

* * * * *